United States Patent
Tamura et al.

(10) Patent No.: US 11,543,684 B2
(45) Date of Patent: Jan. 3, 2023

(54) NON-CORRECTIVE PLASTIC SPECTACLE LENS

(71) Applicant: TALEX CO., LTD., Osaka (JP)

(72) Inventors: Shinzo Tamura, Osaka (JP); Kenzo Wada, Osaka (JP)

(73) Assignee: TALEX CO., LTD., Osaka (JP)

( * ) Notice: Subject to any disclaimer, the term of this patent is extended or adjusted under 35 U.S.C. 154(b) by 234 days.

(21) Appl. No.: 16/464,087

(22) PCT Filed: Nov. 24, 2016

(86) PCT No.: PCT/JP2016/084765
§ 371 (c)(1),
(2) Date: May 24, 2019

(87) PCT Pub. No.: WO2018/096612
PCT Pub. Date: May 31, 2018

(65) Prior Publication Data
US 2019/0293966 A1    Sep. 26, 2019

(51) Int. Cl.
*G02C 7/06* (2006.01)
*B29D 11/00* (2006.01)
(Continued)

(52) U.S. Cl.
CPC .......... *G02C 7/061* (2013.01); *B29D 11/0048* (2013.01); *G02C 7/02* (2013.01); *G02C 7/12* (2013.01)

(58) Field of Classification Search
CPC . G02C 7/061; G02C 7/02; G02C 7/12; G02C 2202/16; B29D 11/0048;
(Continued)

(56) References Cited

U.S. PATENT DOCUMENTS

| 5,757,459 A | * | 5/1998 | Bhalakia | B29C 45/14811 351/159.48 |
| 6,270,698 B1 | * | 8/2001 | Pope | B29C 45/561 264/2.2 |

(Continued)

FOREIGN PATENT DOCUMENTS

| JP | 2005-099687 | 4/2005 |
| JP | 2006-047586 | 2/2006 |

(Continued)

OTHER PUBLICATIONS

M. Koomen, R. Scolnik, and R. Tousey, "A Study of Night Myopia," J. Opt. Soc. Am. 41, 80-90 (1951) (Year: 1951).*

(Continued)

*Primary Examiner* — Travis S Fissel
(74) *Attorney, Agent, or Firm* — Wenderoth, Lind & Ponack, L.L.P.

(57) ABSTRACT

The present invention provides a non-corrective spectacle lens which is a molded plastic lens used by a person having normal eyesight, or a polarizing lens constituted by the molded plastic lens and a polarizing film integrally superposed on the molded plastic lens. In order to moderately reduce the movement of the muscle necessary for focus adjustment, the non-corrective spectacle lens has a spherical power S within the range of $-1.0\ D \leq S < -0.1\ D$, where D is diopter as a unit of the spherical power S.

3 Claims, 2 Drawing Sheets

(51) Int. Cl.
*G02C 7/12* (2006.01)
*G02C 7/02* (2006.01)

(58) Field of Classification Search
CPC ........ B29D 11/00528; B29D 11/00413; B29D 11/0049; B29D 11/00519; B29K 2633/08; B29K 2069/00; B29K 2077/00
USPC .................. 351/159.42 m, 41, 43–47, 49
See application file for complete search history.

(56) References Cited

U.S. PATENT DOCUMENTS

| | | |
|---|---|---|
| 2006/0028613 A1 | 2/2006 | Yasuda |
| 2007/0071844 A1* | 3/2007 | Kadowaki ........ B29D 11/00528 425/408 |
| 2007/0241313 A1 | 10/2007 | Kato |
| 2008/0055541 A1 | 3/2008 | Coulter et al. |
| 2015/0121611 A1 | 5/2015 | Isabelle |
| 2016/0176131 A1* | 6/2016 | Ihara ................ B29D 11/00413 264/1.32 |
| 2018/0043645 A1 | 2/2018 | Saito et al. |

FOREIGN PATENT DOCUMENTS

| | | |
|---|---|---|
| JP | 2007-240553 | 9/2007 |
| JP | 2010-503029 | 1/2010 |
| JP | 2010-85911 | 4/2010 |
| JP | 2012-215725 | 11/2012 |
| JP | 2015-69045 | 4/2015 |
| JP | 2015-200757 | 11/2015 |
| JP | 2015-219488 | 12/2015 |
| JP | 2016-024285 | 2/2016 |
| JP | 2016-35597 | 3/2016 |
| JP | 2016-168829 | 9/2016 |
| JP | 2016-191786 | 11/2016 |
| WO | WO-2015179538 A1 * | 11/2015 ............... G02C 7/10 |

OTHER PUBLICATIONS

International Preliminary Report on Patentability dated May 28, 2019 in International (PCT) Patent Application No. PCT/JP2016/084765, with English Translation.

* cited by examiner

NON-CORRECTIVE PLASTIC SPECTACLE LENS

TECHNICAL FIELD

The present invention relates to a spectacle lens which is not used for eyesight correction, particularly to a non-corrective plastic spectacle lens capable of alleviating eye strain (asthenopia), and a method for manufacturing such a plastic lens.

BACKGROUND ART

Generally, prescription plastic spectacle lenses (i.e., plastic lenses having a power) used for eyesight correction are manufactured by cutting or polishing the back surface of a semi-finished lens material to a predetermined curve. Normal lenses for myopia are polished to a spherical power of −1.5 D (diopters: the unit of the spherical power) or less, and lenses for presbyopia are polished to a spherical power of +1.5 D or more, thereby making them stable lenses having high accuracy (see the below-identified Patent Document 1).

On the other hand, non-corrective (non-prescription) spectacle lenses, i.e., lenses having no power and not used for eyesight correction have a spherical power of 0 D or close to 0 D. Such non-corrective plastic lenses are used for spectacles worn mainly by users having normal eyesight of about 0.7 to 1.2 vision (unit used in Japan), as fashion items, to protect users' eyes from particles in the air, or as polarizing glasses or sunglasses.

Polarizing glasses are capable of alleviating glare caused by the diffuse reflection of sunlight from e.g., a water surface or a snow surface, and alleviating reflected light causing a shadow to appear on the windshield of, e.g. an automobile. Polarizing glasses use lenses having a film-like polarizing element retained inside or on the surface of the lens, or having the polarizing element integrally superposed on the surface of the lens using a printing technique.

PRIOR ART DOCUMENT(S)

Patent Document(s)

Patent Document 1: Japanese Unexamined Patent Application Publication No. 2007-240553

SUMMARY OF THE INVENTION

Problems to be Solved by the Invention

Such conventional non-corrective spectacle plastic lenses as described above are incapable of improving eye strain or eyesight deterioration. For example, when a user overuses his eyes, and, as a result thereof, his ciliary muscle, which relates to the focus adjustment function, starts to get tired, his eyesight gradually deteriorates, thereby causing the user to feel eye strain.

If the ciliary muscle is continuously overused for a long time, as in other skeletal muscles, lactic acid which is a fatigue substance will accumulate therein, and also, if its muscle tissue is damaged, muscle pain will occur, thereby causing eyesight deterioration and severe eye strain.

Especially when spectacles with polarizing lenses or colored lenses are used, their polarizing elements or dyes reduce illuminance the amount of light transmitted through such lenses compared to transparent lenses, so that, for example, in the evening or in an environment where illuminance is reduced due to weather condition, the user may feel it hard to see small objects and letters, or to recognize the colors, color tones, or shapes of remote objects, thereby causing the user to feel eye fatigue or feel it hard to clearly see things.

It is an object of the present invention to provide a non-corrective plastic spectacle lens which overcomes the above problems of conventional such lenses, and which can assist in the eye's focus adjustment function even when the muscle relating to the focus adjustment function gets tired, thereby reducing eye fatigue, and allowing the user to see close objects and letters with high contrast, even while illuminance is low, and thus the amount of light transmitted through the plastic lens is small, and a method for manufacturing such a plastic lens.

Means for Solving the Problems

In order to achieve the above object, the present invention provides a non-corrective spectacle lens comprising a molded plastic lens having a spherical power S within a range of $-1.0\ D \leq S < -0.1\ D$, where D is diopter as a unit of the spherical power S. Namely, in the present invention, a molded plastic lens is used as a non-corrective spectacle lens, the molded plastic lens having a spherical power S within a range of $-1.0\ D \leq S < -0.1\ D$.

Though the above-described plastic lens of the present invention is a non-corrective spectacle lens, since the numerical value range of the spherical power S of the lens is set at $-1.0\ D \leq S < -0.1\ D$ such that the spherical power becomes weak within a predetermined range, if a user having normal eyesight uses the lens, when his ciliary muscle relating to the focus adjustment function starts to get tired, it is possible to reduce the movement of his muscle necessary for the focus adjustment function.

Since the lens of the present invention, which is not an eyesight-correcting lens, can assist in the movement of a user's muscle necessary for the eye's focus adjustment function, the lens makes the user's eye less likely to get tired, e.g., even in an environment where illuminance is reduced. Also, since the lens enables the user to clearly see objects or letters with high contrast, the lens can be used as a non-corrective spectacle plastic lens capable of alleviating eye strain.

The above plastic lens may further comprise a polarizing element integrally superposed on the plastic lens. Using such a plastic lens, it is possible to overcome the disadvantage of a conventional polarizing spectacle lens that such a conventional lens makes it difficult for a user to clearly see things, and causes the user's eye to get tired in a reduced illuminance environment where the user feels dark. Also, it is possible to alleviate moderately reduce the movement of his muscle necessary for focus adjustment. Therefore, such a plastic lens enables the user to feel that contrast is improved even in an environment where illuminance is reduced, and to clearly see small letters or figures, and thus can be used as a non-corrective spectacle lens capable of making the user's eye less likely to get tired.

As a method for efficiently manufacturing the above non-corrective spectacle plastic lens, which can produce such action effects, the present invention provides a method comprising: liquid-tightly combining a mold having a concave spherical surface, and a mold having a convex spherical surface through a ring-shaped gasket such that the concave spherical surface and the convex spherical surface are opposed to each other, so as to define a cavity between the opposed concave and convex spherical surfaces; and introducing a resin material for lens molding into the cavity to form the plastic lens by molding, wherein the concave spherical surface and the convex spherical surface have radii of curvature different from each other such that the non-corrective molded plastic spectacle lens has a spherical power S in a range of −1.0 D≤S<−0.1 D.

According to this method, since the concave spherical surface and the convex spherical surface have radii of curvature different from each other, when a molded plastic lens having a weak power is manufactured, unlike a conventional one, without accurately polishing, with a high level of skill, a semi-finished lens such that the optical center thereof is not displaced from a predetermined position, it is possible to manufacture such a lens by cast molding or injection molding, and thus to efficiently manufacture a polarizing lens for spectacles having a weak power and stable quality, and set such that the range of the spherical power S is −1.0 D≤S<−0.1 D.

The resin material for lens molding used for cast molding, preferably comprises one or more resins for cast molding selected from the group consisting of diethylene glycol bis(allyl carbonate) resin, a polyurethane resin, a thiourethane resin, and an acrylic resin. The reason is because such a resin or resins satisfy both various properties required for the spectacle lens, and efficient formability.

The resin material for lens molding used for injection molding preferably comprises one or more resins for injection molding selected from the group consisting of a polyamide resin, a polycarbonate resin and an acrylic resin. The reason is because, using such a resin or resins, insert molding is possible without damaging a polarizing film.

Effects of the Invention

Since the molded plastic lens according to the present invention is used as a non-corrective spectacle lens, wherein the lens has a spherical power S in the range of −1.0 D≤S<−0.1 D, which is a weak power within a predetermined range, when this non-corrective spectacle lens is used by a user having normal eyesight, the lens assists in the eye's focus adjustment function, and makes the user less likely feel eye strain. The lens makes the user's eye less likely to get tired especially in a low-illuminance environment, and enables the user to clearly see objects or letters with high contrast.

In one aspect of the invention, the plastic lens comprises a polarizing spectacle lens. The polarizing spectacle lens according to the present invention overcomes the disadvantage of conventional polarizing spectacle lenses in that both remote and close objects cannot be see clearly in a dark, low-illuminance environment. That is, the polarizing spectacle lens according to the present invention allows the user to clearly see close objects or letters with high contrast, especially in a low-illuminance environment by minimizing the reduction in the amount of light transmitted through the lens.

According to the manufacturing method of the present invention, since the concave spherical surface and the convex spherical surface have radii of curvature different from each other, unlike a conventional one, without accurately polishing, with a high level of skill, a semi-finished lens such that the optical center thereof is not displaced from a predetermined position, it is possible to efficiently manufacture, by cast molding or injection molding, a polarizing lens for spectacles having a weak power and stable quality. The manufacturing method of the present invention has such advantages.

DETAILED DESCRIPTION OF THE INVENTION

Figure 1A:
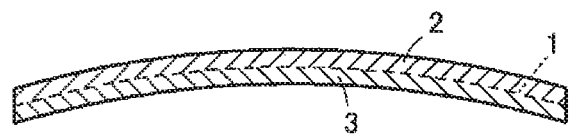
FIG. 1A is a sectional view of a polarizing lens for spectacles embodying the present invention.

FIG. 1A illustrates a molded plastic lens embodying the present invention which includes a polarizing film 1, and front and back plastic layers 2 and 3 integrally superposed, respectively, on the front and back surfaces of the polarizing film 1. This molded plastic lens is a non-corrective, polarizing spectacle lens having a spherical power S of −1.0 D≤S<−0.1 D and used for purposes other than hyperopia or presbyopia correction.

Figure 1B:
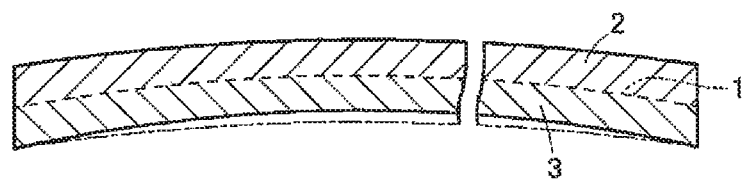
FIG. 1B is an enlarged view of the polarizing lens for spectacles embodying the present invention.

In the embodiment, as illustrated in the enlarged view of FIG. 1B, the radius of curvature of the front surface of the lens, i.e., of the front surface of the front plastic layer 2 (this radius of curvature is known as the "base curve") is equal to the curve (radius of curvature) of the polarizing film 1 after being preformed, so that the lens has a uniform polarizing performance in its entirety. Further, taking also into consideration the refractive index of the material forming the lens, the back surface of the back plastic layer 3 has a radius of curvature smaller than the radius of curvature of the imaginary surface indicated by the dashed line in FIG. 1B, which has the same radius of curvature as the front surface of the front plastic layer 2.

If, for example, diethylene glycol bis(allyl carbonate) resin (trade name: CR39) is used as the resin material for the molded plastic lens having the spherical power of −1.0 D S S<−0.1 D, it is preferable that the radius of curvature of the front surface of the front plastic layer 2 (i.e., the base curve of the lens) is set at 79.84R, and the back surface of the back plastic layer 3 has a radius of curvature of more than 66.533R and 76.769R or less.

The reason why the spherical power S is set within the range of −1.0 D≤S<0.0.1 D as mentioned above is because (i) lenses with a spherical power of less than −1.0 D are substantially no different from lenses for myopia correction, so that if a person with normal eyesight uses such lenses, they will impose a burden on the focus adjustment function, thus making it difficult to improve the person's eyesight, e.g., in an environment where illuminance is reduced; and (ii) lenses with a spherical power of −0.1 D or more are incapable of sufficiently assisting in the focus adjustment function while a person is feeling eye strain, e.g., in an environment where illuminance is reduced, thus making it impossible to reliably ensuring the effects of the present invention. In order to reliably ensure the effects of the present invention, the spherical power S is preferably within the range of −0.80 D<S<−0.25 D, more preferably within the range of −0.75 D<S<−0.20 D.

The non-corrective plastic spectacle lens according to the present invention is incapable of correcting myopia or hyperopia, but is capable of correcting astigmatism as necessary. In this case, the numerical value range of the above spherical power is replaced by the spherical equivalent.

The polarizing film 1 used in the embodiment is a transparent film having optical anisotropy, for example, a film of polyvinyl alcohol containing iodine or a dichroic dye, and uniaxially stretched to three to five times its original axial length so as to be molecularly oriented, or a film having properties similar to such a film.

When manufacturing the polarizing lens, the polarizing film 1 is preformed into a curved shape, so that it is possible to easily form the plastic layers 2 and 3 into spherical shapes by integrally laminating the plastic layers 2 and 3 onto and along the curved polarizing film 1.

The polarizing spectacle lens has a laminated structure in which, for example, the plastic layers 2 and 3 are superposed, respectively, on the front and back surfaces of the polarizing film 1 so that the polarizing film 1 is sandwiched between the plastic layers 2 and 3. In order to ensure necessary strength even when used as a non-prescription lens, the polarizing lens has, for example, a thickness of approximately 1 to 3 mm.

The polarizing spectacle lens according to the present invention, which is characterized by its weak power, can be formed by molding in molds 4 and 5 with the polarizing film 1 inserted in the molds 4 and 5, or by integrally bonding the plastic layers 2 and 3 formed by cast molding beforehand to the polarizing film 1 through adhesive layers.

Figure 2:
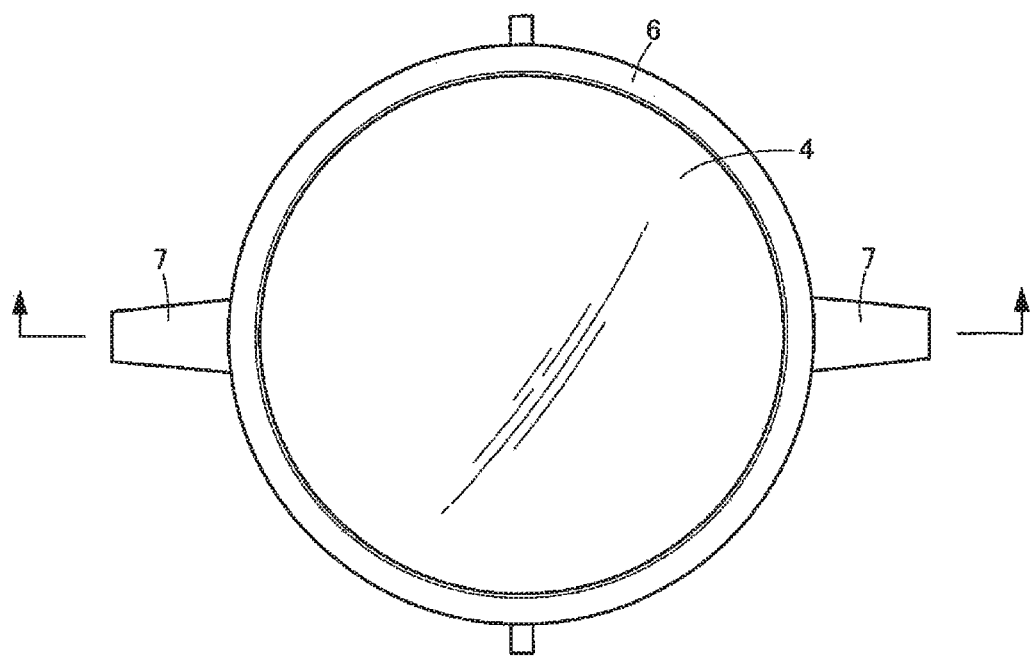
FIG. 2 is a plan view of molds and a gasket combined together so as to be used for manufacturing the polarizing lens for spectacles embodying the present invention.
Figure 3:
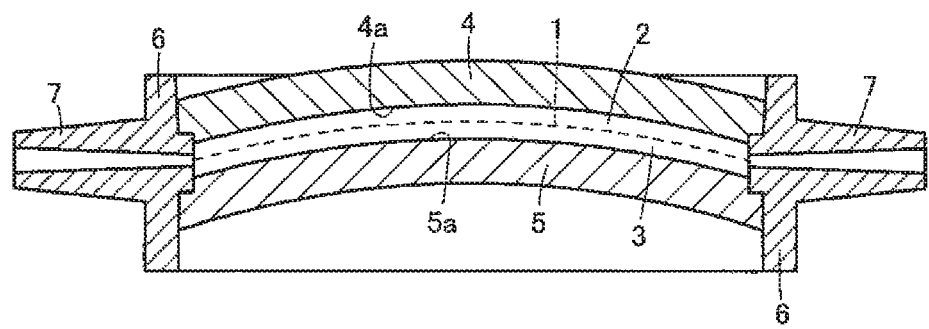
FIG. 3 is a sectional view of the molds and the gasket combined together so as to be used for manufacturing the polarizing lens for spectacles embodying the present invention.

As illustrated in FIGS. 2 and 3, in order to form the polarizing lens by cast molding after inserting the polarizing film 1, first, the edge of the polarizing film 1 preformed into a spherical shape is retained, by known means, on the inner peripheral surface of a ring-shaped gasket 6 having an inner diameter dimension corresponding to the diameter of the edge of the lens to be formed. Then, the molds 4 and 5, which comprise a pair of disc-shaped molds, are fitted to the inner peripheral surface portions of the ring-shaped gasket 6 at its respective ends. Then, the monomer of a resin material for forming the lens is introduced through pipe-shaped gates 7, after being mixed with a polymerization initiator or a hardening agent, into the cavity defined between the two molds. Then, the monomer is polymerized or hardened by, e.g., heating to form the plastic layers 2 and 3 and the polarizing film 1 into an integral body.

The monomer as the resin material of the lens comprises, for example, a liquid resin material for cast molding, such as diethylene glycol bis(allyl carbonate) resin, a polyurethane resin, a thiourethane resin, or an acrylic resin. Such a liquid resin material is introduced into the cavity through the pipe-shaped gates 7, which communicate with the cavity, and comes into contact with the polarizing film 1, while being simultaneously polymerized or hardened, into transparent plastic layers forming an integral body with the polarizing film 1 sandwiched therebetween. Thereafter, by removing the gasket 6 and the molds 4 and 5, which have a concave inner surface 4a and a convex inner surface 5a, respectively, a polarizing spectacle lens is obtained which has radii of curvature defined by the concave and convex inner surfaces 4a and 5a.

The resin material(s) for lens molding may comprise, instead of a resin (or resins) for cast molding as described above, one or more resin materials for injection molding selected from the group consisting of polyamide resins, polycarbonate resins and acrylic resins.

Alternatively, the non-corrective plastic spectacle lens may be obtained by introducing a resin material for lens molding into the cavity, without inserting the polarizing film 1 as described above, so as to form a plastic lens without the polarizing film, and then integrally superposing, on the surface of the thus-formed plastic lens, a polarizing element comprising a printed layer formed by printing polarizing ink. Needless to say, it is also possible to prepare a normal non-corrective plastic spectacle lens, i.e., a lens having no polarizing properties, by omitting the polarizing film 1.

The spectacle lens embodying the present invention may be subjected to post-treatment such as hard coat treatment. For example, the lens may be immersed in a solution containing a silicon compound to form a strengthening film thereon, thereby increasing the surface hardness. Also, the spectacle lens embodying the present invention may be subjected to post-treatment other than hard coat treatment, such as anti-fog treatment, anti-reflection treatment, chemical resistance treatment, antistatic treatment, or mirror treatment, thereby further improving the performance of the lens

EXAMPLES

Example 1

A spectacle lens having a weak power was formed by cast molding using diethylene glycol bis(allyl carbonate) resin (CR39) in a pair of molds for forming spectacle lenses that were combined together such that their concave and convex spherical surfaces come into close contact with each other through a ring-shaped gasket. The concave spherical surface had a radius of curvature of 79.84R, while the convex spherical surface had a radius of curvature of 76.769R (i.e., had a smaller radius of curvature than the concave spherical surface). As a result thereof, the spectacle lens formed had a weak power of −0.25 D.

Example 2

As in Example 1, a spectacle lens was formed by cast molding using diethylene glycol bis(allyl carbonate) resin (CR39) in a pair of molds for forming spectacle lenses that were combined together such that their concave and convex spherical surfaces come into close contact with each other through a ring-shaped gasket. The concave spherical surface had a radius of curvature of 79.84R, while the convex spherical surface had a radius of curvature of 73.77R (i.e., had a smaller radius of curvature than the concave spherical surface). As a result thereof, the spectacle lens formed had a weak power of −0.50 D.

Example 3

As in Example 1, a spectacle lens was formed by cast molding using diethylene glycol bis(allyl carbonate) resin (CR39) in a pair of molds for forming spectacle lenses that were combined together such that their concave and convex surfaces come into close contact with each other through a ring-shaped gasket. The concave spherical surface had a radius of curvature of 79.84R, while the convex spherical surface had a radius of curvature of 71.285R (i.e., had a smaller radius of curvature than the concave spherical surface). As a result thereof, the spectacle lens formed had a weak power of −0.75 D.

Example 4

As in Example 1, a spectacle lens was formed by cast molding using diethylene glycol bis(allyl carbonate) resin (CR39) in a pair of molds for forming spectacle lenses that were combined together such that their concave and convex spherical surfaces come into close contact with each other through a ring-shaped gasket. The concave spherical surface had a radius of curvature of 79.84R, while the convex spherical surface had a radius of curvature of 68.68R (i.e., had a smaller radius of curvature than the concave spherical surface. As a result thereof, the spectacle lens formed had a weak power of −1.00 D.

Comparative Example 1

As in Example 1, a spectacle lens was formed by cast molding using diethylene glycol bis(allyl carbonate) resin (CR39) in a pair of molds for forming spectacle lenses that were combined together such that their concave and convex spherical surfaces come into close contact with each other through a ring-shaped gasket. The concave spherical surface had a radius of curvature of 79.84R, while the convex spherical surface had a radius of curvature of 66.533R (i.e., had a smaller radius of curvature than the concave spherical surface. As a result thereof, the spectacle lens formed was a lens for myopia correction having a power of −1.25 D.

Comparative Example 2

As in Example 1, a spectacle lens was formed by cast molding using diethylene glycol bis(allyl carbonate) resin (CR39) in a pair of molds for forming spectacle lenses that were combined together such that their concave and convex spherical surfaces come into close contact with each other through a ring-shaped gasket. The concave spherical surface had a radius of curvature of 79.84R, while the convex spherical surface had a radius of curvature of 64.387R (i.e., had a smaller radius of curvature than the concave spherical surface. As a result thereof, the spectacle lens formed was a lens for myopia correction having a power of −1.50 D.

Examples 5 to 8

Polarizing spectacle lenses having weak powers of −0.25 D, −0.50 D, −0.75 D and −1.00 D, respectively, were formed by cast molding in exactly the same manner as in Examples 1 to 4 except that the polarizing film 1 (as explained in the above embodiment) was inserted. Specifically, the polarizing film 1 was inserted, when, as in Examples 1 to 4, the pair of molds for forming spectacle lenses were combined together such that their concave and convex spherical surfaces come into close contact with each other through the ring-shaped gasket, and diethylene glycol bis(allyl carbonate) resin (CR39) as a molding material was introduced.

Comparative Examples 3 and 4

Polarizing spectacle lenses for myopia correction having powers of −1.25 D and −1.50 D, respectively, were formed by cast molding in exactly the same manner as in Comparative Examples 1 and 2 except that the polarizing film 1 (as explained in the above embodiment) was inserted. Specifically, the polarizing film 1 was inserted, when, as in Comparative Examples 1 and 2, the pair of molds for forming spectacle lenses were combined together such that their concave and convex spherical surfaces come into close contact with each other through a ring-shaped gasket, and diethylene glycol bis(allyl carbonate) resin (CR39) as a molding material was introduced.

Using the non-corrective plastic spectacle lenses according to the Examples 1 to 8; and the corrective plastic spectacle lenses according to Comparative Examples 1 to 4, i.e., lenses whose visible light transmittance is so low as to cause eyesight deterioration, as described below, an eyesight measuring test was conducted to confirm the effect of improving the eyesight by the individual lenses.

Eyesight Measuring Test

A special spectacle frame for eyesight testing was prepared to which, for the purpose of mimicking a low illuminance environment (50-100 lux), colored or polarizing spectacle lenses can be fitted, together with transparent lenses having a predetermined power so as to be superposed on the transparent lenses; and the lenses according to each of the Examples and Comparative Examples were fitted to this spectacle frame together with the below-described colored spectacle lenses (CL) or polarizing spectacle lenses (PL) to measure the eyesight of each test subject having normal eyesight in an indoor environment (where the illuminance was about 500 lux).

The above colored lenses (CL) and polarizing lenses (PL) were formed by adding, during cast molding, a blue dye to the resin for cast molding such that the visible light transmittance would be 13% (CL) and 12% (PL). The test subjects consisted of nine healthy adult males and females (ages 23 to 29) having normal unaided eyesight of 0.7 to 1.5 vision. The results of the eyesight measuring test are shown in Tables 1 and 2 below.

The numbers in the brackets in Tables 1 and 2 indicate, in four stages, the evaluated values of the difference between eyesight A, which is the eyesight through only the colored lenses (CL) whose spherical power S is 0 (zero), and eyesight B, which is the eyesight through both of the lenses of each of the Examples and Comparative Examples, having the predetermined spherical power S, and the colored lenses (CL). Specifically, Evaluated value "3" means that the difference between eyesight A and eyesight B is 0.3 or more, and thus "very effective"; evaluated value "2" means that the difference between "A" and "B" is 0.2, and thus "moderately effective", evaluated value "1" means that the difference between "A" and "B" is 0.1, and thus "slightly effective (i.e., the use of the lenses is still worthwhile)"; and evaluated value "0" means the difference between "A" and "B" is 0 or less, and thus "ineffective". Tables 1 and 2 also show the average value of the evaluated values for each of Examples 1 to 8 and Comparative Examples 1 to 4.

TABLE 1

| Tested subjects | | | Reference Example [Colored lens: CL(visible light transmittance 13%)] Eyesight A | Example 1 [S - 0.25 lens] + CL Eyesight B (and evaluated value) | Example 2 [S - 0.50 lens] + CL Eyesight B (and evaluated value) | Example 3 [S - 0.75 lens] + CL Eyesight B (and evaluated value) | Example 4 [S - 1.00 lens] + CL Eyesight B (and evaluated value) | Comparative Example 1 [S - 1.25 lens] + CL Eyesight B (and evaluated value) | Comparative Example 2 [S - 1.50 lens] + CL Eyesight B (and evaluated value) |
|---|---|---|---|---|---|---|---|---|---|
| Gender | Age | Unaided eyesight | | | | | | | |
| Female | 28 | 0.7 | 0.6 | 0.9 (3) | 0.9 (3) | 0.9 (3) | 0.9 (3) | 0.8 (2) | 0.8 (2) |
| Female | 26 | 1.0 | 0.8 | 0.9 (2) | 0.9 (2) | 0.9 (2) | 0.9 (1) | 0.8 (1) | 0.7 (0) |
| Male | 23 | 1.0 | 0.9 | 0.9 (1) | 1.0 (2) | 1.5 (3) | 1.2 (3) | 1.5 (3) | 1.2 (3) |
| Mate | 31 | 1.2 | 0.9 | 1.0 (2) | 1.2 (3) | 1.2 (3) | 1.0 (1) | 1.0 (2) | 1.0 (2) |
| Female | 28 | 1.5 | 1.2 | 1.2 (1) | 1.0 (0) | 1.0 (0) | 1.2 (1) | 1.2 (1) | 1.0 (0) |
| Female | 27 | 1.0 | 0.9 | 1.2 (3) | 1.2 (3) | 1.0 (2) | 1.2 (3) | 1.0 (2) | 1.0 (2) |
| Male | 26 | 1.2 | 1.0 | 1.2 (2) | 1.2 (2) | 1.2 (2) | 1.2 (2) | 1.2 (2) | 1.2 (2) |
| Male | 29 | 1.2 | 1.2 | 1.2 (1) | 1.2 (1) | 1.2 (1) | 1.0 (0) | 1.0 (0) | 1.0 (0) |
| Mate | 39 | 0.7 | 0.7 | 1.0 (3) | 1.2 (3) | 1.2 (3) | 1.2 (3) | 1.5 (3) | 1.2 (3) |
| Average value (of evaluated values) | | | | 2.0 | 2.1 | 2.1 | 1.9 | 1.8 | 1.6 |

TABLE 2

| Test subjects | | | Reference Example [Polarizing lens: PL(visible light transmittance 12%)] Eyesight A | Example 5 [S - 0.25 lens] + PL Eyesight B (and evaluated value) | Example 6 [S - 0.50 lens] + PL Eyesight B (and evaluated value) | Example 7 [S - 0.75 lens] + PL Eyesight B (and evaluated value) | Examples 8 [S - 1.00 lens] + PL Eyesight B (and evaluated value) | Comparative Example 3 [S - 1.25 lens] + PL Eyesight B (and evaluated value) | Comparative Example 4 [S - 1.50 lens] + PL Eyesight B (and evaluated value) |
|---|---|---|---|---|---|---|---|---|---|
| Gender | Age | Unaided eyesight | | | | | | | |
| Female | 28 | 0.7 | 0.7 | 0.7 (1) | 0.9 (3) | 1.0 (3) | 1.0 (3) | 0.9 (2) | 0.8 (2) |
| Female | 26 | 1.0 | 0.8 | 0.8 (2) | 0.8 (1) | 1.0 (2) | 1.0 (2) | 0.9 (2) | 0.8 (1) |
| Male | 23 | 1.0 | 0.9 | 0.9 (2) | 1.0 (2) | 1.2 (3) | 1.5 (3) | 2.0 (3) | 1.5 (3) |
| Male | 31 | 1.2 | 1.2 | 1.2 (0) | 1.0 (0) | 1.0 (0) | 1.0 (0) | 1.2 (1) | 1.0 (0) |
| Female | 28 | 1.5 | 1.2 | 1.2 (1) | 1.0 (0) | 1.0 (0) | 1.2 (1) | 1.0 (0) | 1.0 (0) |
| Female | 27 | 1.0 | 0.9 | 0.9 (3) | 1.2 (3) | 1.2 (3) | 1.2 (3) | 1.2 (3) | 1.2 (3) |
| Male | 26 | 1.2 | 1.0 | 1.0 (2) | 1.2 (2) | 1.2 (2) | 1.2 (2) | 1.2 (2) | 1.2 (2) |
| Male | 29 | 1.2 | 1.2 | 1.2 (1) | 1.2 (1) | 1.2 (1) | 1.2 (1) | 1.0 (0) | 1.0 (0) |
| Mate | 39 | 0.7 | 0.6 | 0.8 (2) | 1.0 (3) | 1.2 (3) | 1.2 (3) | 1.2 (3) | 1.2 (3) |
| Average value (of evaluated values) | | | | 1.5 | 1.7 | 1.9 | 2.0 | 1.8 | 1.6 |

As is apparent from the results shown in Tables 1 and 2, eyesight B of the test subjects through the lenses of each of Examples 1-8, which have a power within the predetermined range, i.e., −0.25 D, −0.50 D −0.75 D, or −1.00 D, was clearly better than eyesight A, i.e., the eyesight through only the colored lenses (CL) or polarizing lenses (PL). It also turned out that, especially by using, in an environment where illuminance is low, or together with colored lenses or polarizing lenses, molded plastic lenses having a spherical power S within the range of −1.0 D≤S<−0.1 D, eyesight improves.

Eyesight B through the lenses of each of Examples 1, 2, 5 and 6, which has a relatively weak power, was also clearly better than eyesight A, and such an eyesight improvement effect increased as the power of the lenses used increased, but when the power was more than −1.0 D, the average value of the evaluated values decreased. In view of this tendency, it seems that, if the power of the lenses used is more than −1.0 D, in an environment where illuminance is low, the lenses still assist in the eye's focus adjustment function, but imposes a burden on the eye's focus adjustment function beyond this assistance When, in order to mimic an environment where illuminance is low, colored lenses (visible light transmittance 13%) or polarizing lenses (visible light transmittance 12%) were superposed on the lenses of each of Comparative Examples 1 to 4, which have a power outside the predetermined range, i.e., −1.25 D or −1.50 D, eyesight B did not improve as expected by the adjustment of the lens power, but rather deteriorated, due, for example, to the fatigue of the muscle involved in the eye's focus adjustment function.

The results of the above eyesight measuring test show that, the spectacle lenses according to Examples 1 to 4, and the polarizing spectacle lenses according to Examples 5 to 8 can be used as non-corrective plastic spectacle lenses assisting in the eye's focus adjustment function in the state where muscle relating to the eye's focus adjustment function is likely to get tired in a reduced illuminance environment, thereby making a user's eye less likely to get tired and enabling the user to clearly see close objects and letters even in a reduced illuminance environment.

DESCRIPTION OF REFERENCE NUMERALS

1: polarizing film
2, 3: plastic layer
4, 5: mold
4a: concave inner surface
5a: convex inner surface
6: gasket
7: pipe-shaped gate

The invention claimed is:
1. A method for manufacturing a molded plastic spectacle lens, the method comprising:
liquid-tightly combining a mold having a concave spherical surface, and a mold having a convex spherical surface through a ring-shaped gasket such that the concave spherical surface and the convex spherical surface are opposed to each other, so as to define a cavity between the opposed concave and convex spherical surfaces;

preforming and inserting a polarizing element into the cavity; and introducing a resin material for lens molding into the cavity to form the plastic lens by molding, such that the plastic lens has a laminated structure comprising a front plastic layer and a back plastic layer that sandwich the polarizing film from a front side and a back side of the polarizing film, respectively, wherein a front surface of the front plastic layer has a radius of curvature equal to a radius of curvature of the preformed polarizing film, and the concave spherical surface has a radius of curvature of 79.84R and the convex spherical surface has a radius of curvature larger than 66.533R and not larger than 76.769R such that the molded plastic spectacle lens has a spherical power S in a range of $-1.0\ D \leq S < -0.1\ D$.

2. The method according to claim 1, wherein the resin material for lens molding comprises one or more resins for cast molding selected from the group consisting of diethylene glycol bis(allyl carbonate) resin, a polyurethane resin, a thiourethane resin, and an acrylic resin.

3. The method according to claim 1, wherein the resin material for lens molding comprises one or more resins for injection molding selected from the group consisting of a polyamide resin, a polycarbonate resin and an acrylic resin.

* * * * *